(12) United States Patent
Clark et al.

(10) Patent No.: US 9,475,717 B2
(45) Date of Patent: Oct. 25, 2016

(54) WATER PURIFICATION SYSTEM ENGINEERED FOR LEGIONELLA CONTROL IN INDUSTRIAL AND COMMERCIAL WATER SYSTEMS

(71) Applicant: Total Water Treatment Systems, Inc., Madison, WI (US)

(72) Inventors: Ken Clark, Madison, WI (US); Skip Heffernan, Madison, WI (US)

(73) Assignee: TOTAL WATER TREATMENT SYSTEMS, INC., Madison, WI (US)

( * ) Notice: Subject to any disclaimer, the term of this patent is extended or adjusted under 35 U.S.C. 154(b) by 207 days.

(21) Appl. No.: 13/975,003

(22) Filed: Aug. 23, 2013

(65) Prior Publication Data

US 2014/0054222 A1   Feb. 27, 2014

Related U.S. Application Data

(60) Provisional application No. 61/692,494, filed on Aug. 23, 2012.

(51) Int. Cl.
| | |
|---|---|
| *B01D 61/00* | (2006.01) |
| *C02F 1/44* | (2006.01) |
| *C02F 1/32* | (2006.01) |
| *C02F 1/68* | (2006.01) |
| *B01D 37/00* | (2006.01) |
| *C02F 9/00* | (2006.01) |
| *C02F 1/28* | (2006.01) |
| *C02F 1/42* | (2006.01) |

(52) U.S. Cl.
CPC .............. *C02F 9/00* (2013.01); *C02F 1/283* (2013.01); *C02F 1/32* (2013.01); *C02F 1/42* (2013.01); *C02F 1/441* (2013.01); *C02F 1/444* (2013.01); *C02F 2209/05* (2013.01)

(58) Field of Classification Search
CPC .............. C02F 1/42; C02F 1/32; C02F 9/00; C02F 1/441; C02F 1/444; C02F 1/325; B01D 61/025
USPC ......................................... 210/650–652, 760
See application file for complete search history.

(56) References Cited

U.S. PATENT DOCUMENTS

| | | | | |
|---|---|---|---|---|
| 4,160,727 A | * | 7/1979 | Harris, Jr. ..................... | 210/652 |
| 4,623,467 A | * | 11/1986 | Hamlin ........................ | 210/652 |
| 4,787,980 A | * | 11/1988 | Ackermann et al. ......... | 210/638 |
| 5,174,901 A | * | 12/1992 | Smith ........................... | 210/652 |
| 5,427,682 A | * | 6/1995 | Vogel et al. ................ | 210/257.2 |
| 6,080,313 A | * | 6/2000 | Kelada .......................... | 210/631 |
| 6,190,556 B1 | * | 2/2001 | Uhlinger ...................... | 210/636 |
| 6,607,668 B2 | * | 8/2003 | Rela ..................... | B01D 61/025 |
| | | | | 210/143 |
| 7,632,410 B2 | * | 12/2009 | Heiss ........................ | C02F 9/00 |
| | | | | 210/143 |
| 8,361,384 B1 | * | 1/2013 | Kolstad .................... | C02F 9/00 |
| | | | | 210/748.01 |
| 8,480,906 B2 | * | 7/2013 | Kobayashi ................ | C02F 9/00 |
| | | | | 210/660 |
| 2004/0118780 A1 | * | 6/2004 | Willman et al. ............. | 210/652 |
| 2006/0124517 A1 | * | 6/2006 | Scaringe ....................... | 210/137 |
| 2007/0119779 A1 | * | 5/2007 | Muramoto et al. ........... | 210/639 |
| 2008/0105620 A1 | * | 5/2008 | Hicks ........................... | 210/681 |
| 2008/0173583 A1 | * | 7/2008 | Boodoo .................... | C02F 1/42 |
| | | | | 210/652 |
| 2008/0290033 A1 | * | 11/2008 | Kimball et al. ............. | 210/652 |
| 2009/0095666 A1 | * | 4/2009 | Heiss ............................ | 210/138 |

(Continued)

*Primary Examiner* — Ana M. Fortuna
(74) *Attorney, Agent, or Firm* — Casimir Jones, S.C.

(57) ABSTRACT

The present invention relates to water purification systems and uses thereof. In particular, the present invention relates to the use of water filtration systems to combat *Legionella* bacterial contamination of industrial and commercial water systems, such as grocery store misting systems.

10 Claims, 1 Drawing Sheet

(56) References Cited

U.S. PATENT DOCUMENTS

2011/0278222 A1* 11/2011 Ikuno et al. .................. 210/631
2013/0313191 A1* 11/2013 Wolf et al. .................... 210/638
2014/0054222 A1* 2/2014 Clark et al. ................... 210/638
2015/0027879 A1* 1/2015 Myre ...................... C02F 1/325
  204/260

* cited by examiner

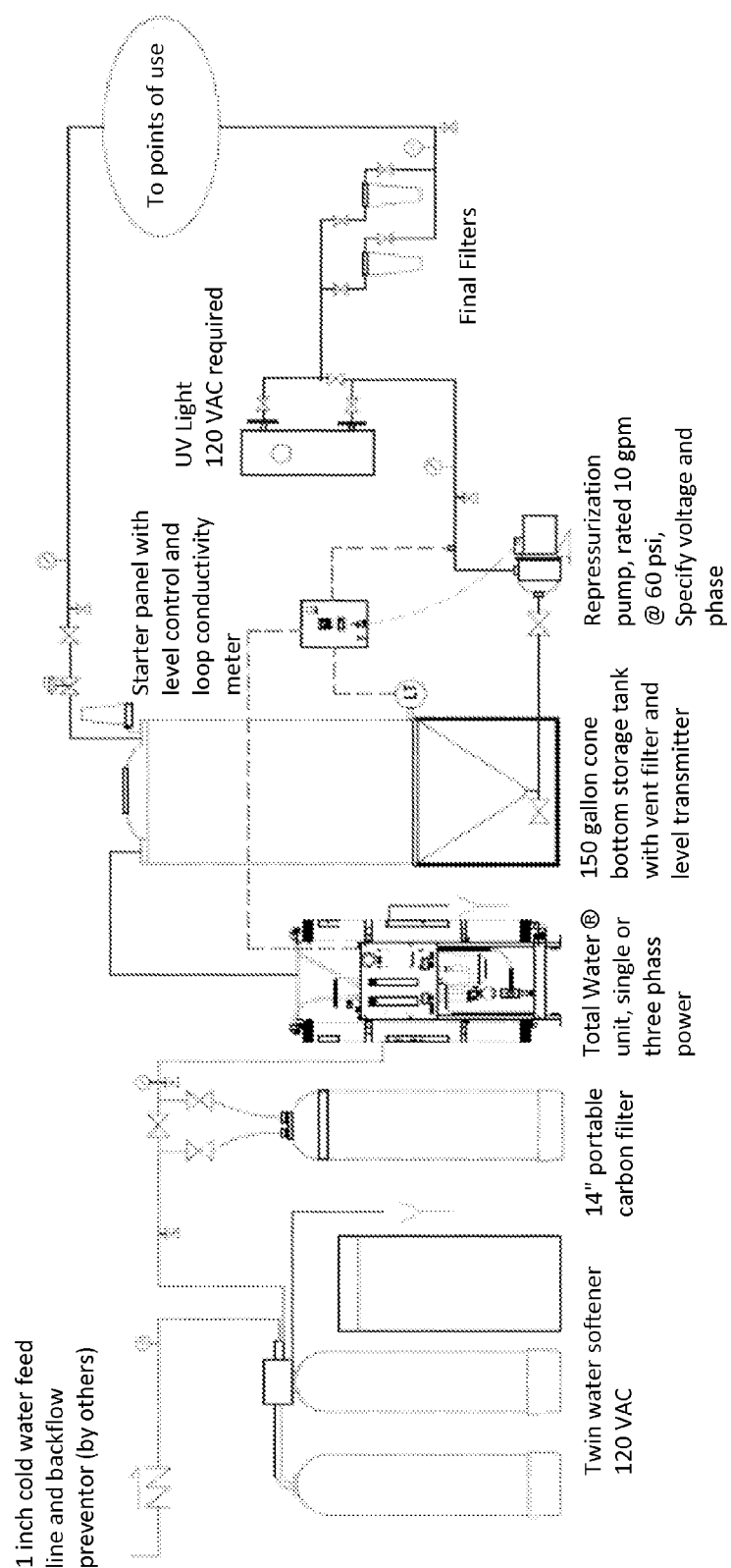

WATER PURIFICATION SYSTEM ENGINEERED FOR LEGIONELLA CONTROL IN INDUSTRIAL AND COMMERCIAL WATER SYSTEMS

The present application claims priority to U.S. Provisional Patent Application Ser. No. 61/692,494, filed Aug. 23, 2012, the disclosure of which is herein incorporated by reference in its entirety.

FIELD OF THE INVENTION

The present invention relates to water purification systems and uses thereof. In particular, the present invention relates to the use of water filtration systems to combat *Legionella* bacterial contamination of industrial and commercial water systems, such as grocery store misting systems.

BACKGROUND OF THE INVENTION

*Legionella* is a genus of Gram-negative bacteria comprising many species and distinct antigenic types with *Legionella pneumophila* being the most common pathogenic species. Legionaires' disease is the common name for a variety of diseases resulting from infection by *Legionella bacteria*. The most common presentation of many *Legionella* species is acute pneumonia (legionellosis), but many species of the bacteria are also capable of causing an influenzalike illness known as Pontiac fever (Winn, W. C. Jr. (1996). *Legionella* (*In: Baron's Medical Microbiology, Baron, S. et al., eds*. (4th ed.). University of Texas Medical Branch).

*Legionella* species are widely present in environmental water supplies such as rivers, lakes, and drinking water. To prevent infection by these bacteria, water is often disinfected with chlorine or heat, but bacteria often remain following these treatments. Of particular concern are nosocomial infections by these bacteria, given that many hospital water supplies have been demonstrated to contain *Legionella* bacteria. Hospitals expend a large amount of resources on a variety of disinfectant methods to reduce *Legionella* infections (Yu V L, *Infection Control and Hospital Epidemiology* (2011) 32(2). Controlling *Legionella* in Hospital Drinking Water: An Evidence-Based Review of Disinfection Methods).

Other known environmental sources of *Legionella* bacteria include swimming pools, evaporative condensers, cooling towers, nebulizers, humidifiers, ornamental fountains, and whirlpool spas. Dissemination of bacteria from environment to host generally requires aerosolization of the contaminated water. The contaminated water in the aforementioned sources can be aerosolized incidentally, for example during toilet flushing, or by design, as seen in nebulizers and fountains. Inhalation of these bacterial aerosols is thought to lead to the acute pneumonia observed in patients exhibiting legionellosis.

Recognizing the public health concerns posed by *Legionella* bacteria, the American Society of Heating, Refrigerating and Air-Conditioning Engineers (ASHRAE) established a Standard Practice for use by facility managers and owners to prevent *Legionella* contamination in building water systems. This standard, known as ASHRAE Standard 188P, specifies a practice to identify the conditions in a water system that can be made less favorable to the growth and transmission of *Legionella*. To optimize the advice given in this report, Hazard Analysis and Critical Control Point (HACCP) plans were used.

What is needed are new systems for addressing public health risks associated with *Legionella* bacteria.

SUMMARY OF THE INVENTION

The present invention relates to water purification systems and uses thereof. In particular, the present invention relates to the use of water filtration systems to combat *Legionella* bacterial contamination of industrial and commercial water systems, such as grocery store misting systems.

For example, in some embodiments, the present invention provides a system for killing, removing, or slowing the grown of bacteria comprising: a water softener, a carbon filter, a reverse osmosis component, a purified water storage vessel, a recirculating pump, an ultraviolet light disinfection component, a final filtration component, specialized distribution piping, and a nozzle.

When produced and maintained as prescribed in this application, the purified water system described herein is compliant with the ASHRAE Standard 188P. If the steps described herein are followed, *Legionella* bacterial loads in the water are drastically reduced.

In some embodiments, the invention is a method for reducing or preventing *Legionella* bacterial contamination of a water supply system comprising: passing a fluid through a water softening component, passing the effluent from the water softening component through a carbon filtration component, passing the effluent from the carbon filtration component through a machine capable of reverse osmosis, passing the effluent from the machine capable of reverse osmosis through a storage vessel, passing the effluent from the storage vessel through a recirculating pipe, passing the effluent from the recirculating pipe through an ultraviolet light component, passing the effluent from the ultraviolet light component through a final filtration, contacting the effluent from the final filtration with distribution piping, and contacting the distribution piping with a nozzle. In some embodiments, the water softening component comprises two units which operate alternately. In some embodiments, the storage vessel is airtight except for a 0.2-micron vent filter. In some embodiments, the recirculating pump delivers a minimum of 3 feet per second flow velocity. In some embodiments, the final filtration utilizes a 0.2 micron filter. In some embodiments, the distribution piping circulates returns some of the fluid from the final filtration component to the storage vessel. In some embodiments, the conductivity of the fluid is measured at one or more times.

In some embodiments, the invention is a method of providing purified water to grocery store misting systems comprising: passing a fluid through a water softening component, passing the effluent from the water softening component through a carbon filtration component, passing the effluent from the carbon filtration component through a machine capable of reverse osmosis, passing the effluent from the machine capable of reverse osmosis through a storage vessel, passing the effluent from the storage vessel through a recirculating pipe, passing the effluent from the recirculating pipe through an ultraviolet light component, passing the effluent from the ultraviolet light component through a final filtration, contacting the effluent from the final filtration with distribution piping, and contacting the distribution piping with a nozzle. In some embodiments, the water softening component comprises two units which operate alternately. In some embodiments, the storage vessel is airtight except for a 0.2-micron vent filter. In some embodiments, the recirculating pump delivers a minimum of 3 feet per second flow velocity. In some embodiments, the final filtration utilizes a 0.2 micron filter. In some embodiments, the distribution piping circulates returns some of the fluid from the final filtration component to the storage vessel. In some embodiments, the conductivity of the fluid is measured at one or more times.

In some embodiments, the invention is a system for providing purified water to grocery store misting systems comprising: a fluid inlet means for introducing a flow of water, a water softening component, a carbon filtration component, a reverse osmosis component, a water storage vessel, a recirculation pump, a conductivity meter, an ultraviolet light producing unit, a final filter with pores no larger than 0.2 microns, and distribution piping capable of attaching to a misting nozzle. In some embodiments, the water softening component contains two units which operate alternately. In some embodiments, the water storage vessel is airtight except for a 0.2-micron vent filter. In some embodiments, the entire contents of the water storage vessel is exposed to ultraviolet light and/or filtration every 30 minutes.

DESCRIPTION OF THE FIGURES

FIG. 1 shows a diagram of one exemplary embodiment of the invention described herein.

DEFINITIONS

To facilitate an understanding of the present invention, a number of terms and phrases are defined below.

The term "sample" as used herein is used in its broadest sense. A sample may comprise any biological, industrial, or environmental material, including, but not limited to, water samples from any source.

As used herein, the term "filter" includes any substance through which a liquid or gas can be passed to remove impurities. The filter can be made of paper, cloth, sand, carbon, and many other substances. In a more general sense, filtering can include any process that removes particles, ions, molecules, or other pieces of matter from a fluid. "Filter" can be used as a verb to mean "passing a fluid through a filter." "Filtering out" can be a verb meaning "removing impurities with a filter." "Filtering" can also be referred to as "filtration."

As used herein, the term "produce" includes any agricultural product, especially fruits and vegetables. Many grocery stores contain produce such as broccoli, lettuce, berries, squash, spinach, and the like.

As used herein, the term "misting" includes water and any other liquid finely suspended in air. In the context of grocery stores, misting of water is often used on food such as produce to maintain a fresh appearance. Restaurants and other commercial and industrial businesses use misting in public areas for cooling of people or animals.

As used herein, the term "aerosolize" includes any process that disperses a liquid into a gas in tiny suspended droplets. One specific use of the word "aerosolize" refers to the process by which bacteria enter the air, potentially leading to inhalation of the bacteria.

As used herein, the term "grocery store" and "supermarket" are used to include any place where foodstuffs and various household supplies are sold.

As used herein, "tap water" includes any water that is drawn from the pipes in a building. "Tap water" includes municipal water and well water.

As used herein, "recirculating pump" includes any device that causes a fluid to have a current and causes the effluent fluid to return in full or in part to said device. The term "purified water recirculation pump" refers to a type of recirculating pump. In some embodiments referred to herein, a purified water recirculation pump delivers a minimum of 3 feet per second flow velocity in the fluid and operates continuously.

As used herein, the term "water softener" includes any process that reduces the concentration of calcium, magnesium, and other ions in water. The removal of the ions during this process makes the water more compatible with soaps and less likely to cause fouling of plumbing. There are many methods of water softening but one common method uses an ion-exchange resin to exchange the calcium, magnesium, and other ions for sodium ions.

As used herein, the term "carbon filtration" includes any method of filtering that uses activated carbon to remove contaminants and impurities. Specifically, chlorine, chloramines, sediments, and other organic compounds can be removed from a fluid by carbon filtration. Activated carbon contains many pores and thereby a large surface area. The iodine number of activated carbon describes the adsorption capacity of the carbon.

As used herein, the term "reverse osmosis" includes any process that filters out large molecules and ions from a fluid by applying pressure to fluid on one side of a selective membrane. Given a membrane with proper pore size, the aforementioned application of pressure will cause the solvent to be purified on the side of the membrane opposite the pressure while large molecules and ions will remain on the side to which pressure is being applied. Reverse osmosis can be used to create water of very high purity.

As used herein, the terms "purified" or "to purify" refer, to the removal of undesired components from a sample. In a relative sense, a substance is purified if it contains fewer undesired components than it had at a previous point in time.

As used herein, the term "conductivity meter" refers to any device capable of measuring the electrical conductivity in a solution. As used herein, conductivity meters are used to determine the level of chemical impurities in a sample.

As used herein, the term "impurity" refers to any undesirable component in fluids and solids. Some examples of impurities found in a fluid include ions, particles, organic compounds, and particular molecules.

As used herein, the term "ultraviolet disinfection" refers to the process by which electromagnetic radiation with a wavelength shorter than visible light but longer than X-rays in the range of 10-400 nm is applied to a sample for a duration. If the wavelength and duration are selected appropriately, this process can drastically reduce the microbial load of a sample.

As used herein, the term "microbial load" refers to the relative or absolute amount of microbes within a sample.

The terms "bacteria" and "bacterium" refer to all prokaryotic organisms, including those within all of the phyla in the Kingdom Procaryotae. The term is intended to refer to members of the *Legionella* genus. It is intended that the term encompass all microorganisms considered to be bacteria including Mycoplasma, Chlamydia, Actinomyces, Streptomyces, and Rickettsia. All forms of bacteria are included within this definition including cocci, bacilli, spirochetes, spheroplasts, protoplasts, etc. Also included within this term are prokaryotic organisms that are gram negative or gram positive. "Gram negative" and "gram positive" refer to staining patterns with the Gram-staining process that is well known in the art. (See e.g., Finegold and Martin, Diagnostic Microbiology, 6th Ed., C V Mosby St. Louis, pp. 13-15 [1982]). "Gram positive bacteria" are bacteria that retain the primary dye used in the Gram stain, causing the stained cells to appear dark blue to purple under the microscope. "Gram negative bacteria" do not retain the primary dye used in the Gram stain, but are stained by the counterstain. Thus, gram negative bacteria appear red. In some embodiments, the bacteria are those capable of causing disease (pathogens) and those that cause production of a toxic product, tissue degradation or spoilage.

As used herein the term "biofilm" refers to an aggregation of microorganisms (e.g., bacteria) surrounded by an extracellular matrix or slime adherent on a surface.

As used herein, the term "pathogen" refers to a biological agent that causes a disease state (e.g., infection, cancer, etc.) in a host. "Pathogens" include, but are not limited to, bacteria, fungi, archaea, protozoans, nematodes, mycoplasma, and other parasitic organisms.

As used herein, the term "microorganism" refers to any species or type of microorganism, including but not limited to, bacteria, archea, fungi, protozoans, mycoplasma, and parasitic organisms. The term "microbe" is largely equivalent to the term "microorganism."

As used herein, the term "distribution piping" refers to any system of pipes that delivers water from a water source such as a municipal water supply or purified water storage vessel to a point of use. In some embodiments, "distribution piping" refers to a system in which the water is continually circulating from the storage vessel to the points of use and back to the storage vessel with no dead legs larger than 20 pipe diameters.

As used herein, the term "point of use," in reference to water, refers to any location where water is used. Potential points of use include but are not limited to water faucets, misting systems, drinking fountains, irrigation systems, and whirlpool water supplies.

As used herein, the term "dead leg" refers to any section of piping that does not receive significant flow. These pockets of largely undisturbed fluid provide suitable conditions for growth and reproduction of many species of microbes including *Legionella* bacteria.

As used herein, the term "pipe" refers to any hollow body capable of conducting a fluid. The terms "tube" and "piping" are largely similar to the term "pipe."

As used herein, the term "preventative maintenance" refers maintenance, including tests, measurements, adjustments, and parts replacement, performed specifically to prevent faults from occurring.

As used herein, the term "nozzle" refers to any device used to control the direction or characteristics of a fluid flow as it exits or enters an enclosed chamber or pipe via an orifice. Nozzles are often used to increase the velocity of a flow at the point of use.

As used herein, the term "airtight" refers to the quality of being impervious to air or other fluids.

As used herein, the term "fluid" refers to any substance that has no fixed shape. Generally fluids also yield easily to external pressure and flow easily.

DETAILED DESCRIPTION OF THE INVENTION

*Legionella* is a genus containing many species of bacteria that are pathogenic to humans. Since the discovery of *Legionella pneumophila* in the 1970's, this genus has expanded to include many species including: *Legionella adelaidensis, Legionella anisa, Legionella beliardensis, Legionella birminghamensis, Legionella bozemanii, Legionella brunensis, Legionella busanensis, Legionella cherrii, Legionella cincinnatiensis, Legionella donaldsonii, Legionella drancourtii, Legionella drozanskii, Legionella erythra, Legionella fairfieldensis, Legionella fallonii, Legionella feeleii, Legionella geestiana, Legionella genomospecies, Legionella gratiana, Legionella gresilensis, Legionella hackeliae, Legionella impletisoli, Legionella israelensis, Legionella jamestowniensis, Legionella jeonii, Legionella jordanis, Legionella lansingensis, Legionella londiniensis, Legionella longbeachae, Legionella lytica, Legionella maceachernii, Legionella micdadei, Legionella moravica, Legionella nautarum, Legionella oakridgensis, Legionella parisiensis, Legionella pneumophila, Legionella quateirensis, Legionella quinlivanii, Legionella rowbothamii, Legionella rubrilucens, Legionella sainthelensi, Legionella santicrucis, Legionella shakespearei, Legionella spiritensis, Legionella steigerwaltii, Legionella taurinensis, Legionella tucsonensis, Legionella wadsworthii, Legionella waltersii, Legionella worsleiensis, Legionella yabuuchiae.*

The clinical relevance of *Legionella* first came to light during an outbreak of what came to be known as Legionairres' disease in 1976. During this initial outbreak, as many as 221 individuals experienced symptoms ranging from pneumonia to chest pain, and 34 deaths were recorded. The outbreak was traced to *Legionella pneumophila* in a hotel air conditioning system. Currently, legionellosis is known to cause two distinct conditions. Legionnaire's disease, also known as Legion Fever, leads to fever and pneumonia while Pontiac fever leads to a less severe respiratory illness more similar to acute influenza than pneumonia. Legionairres' disease has become a condition of great public health concern. In fact, the Massachusetts Department of Public Health Bureau of Communicable Disease Control estimates that the overall case-fatality rate is 5-30%. Furthermore, the disease is thought to affect 8,000 to 18,000 individuals each year in the United States, with *L. pneumophila* being the primary agent of infection.

*Legionella* bacteria are present at low levels in the environment in many locations where freshwater is present including lakes and streams. Optimal conditions for growth include temperatures of about 30° C.-50° C. (86° F.-122° F.), stagnant water, presence of amoebae which can serve as hosts for the bacteria, and presence of rust and scale. Given these optimal growth conditions, it is not surprising that *Legionella* outbreaks often occur in locations such as water heaters, water distribution systems, fountains, spa baths, swimming pools, humidifiers, cooling towers, and air and water handling systems. As the *Legionella* bacterial load rises in a water source, transmission to humans becomes increasingly likely. This transmission to humans is thought to require aerosolization of the water. For this reason, nebulizers and other misting devices can be particularly effective transmission devices for *Legionella* bacteria. In some embodiments, the invention described herein relates to methods and systems for preventing or reducing the spread of *Legionella* bacteria, for example, in grocery store produce misters and other commercial and industrial water systems. It will also be appreciated that these system further find use in the reduction of other bacterial and bioagents in water systems. As such, reduction of fouling and biofilm formation are provided.

In some embodiments, the spread of *Legionella* bacteria is reduced or prevented with effective water filtration systems and methods. In some embodiments, provided here is a produce misting system comprising one or more or all the following components: a water softener, a carbon filter, a reverse osmosis filter, a water storage vessel, a recirculation pump, a conductivity meter, an ultraviolet light producing unit, a final filter, specialized distribution piping, and a misting nozzle.

In some embodiments, tap water is brought into the system via a fluid inlet. This component can comprise any means of delivering water to the system. For example, in some embodiments the fluid inlet is a hose which carries tap water. In other embodiments, the fluid inlet is a tube.

In some embodiments, the water softening component comprises resin beds which reduce the concentration of certain metal ions including calcium and magnesium which are naturally present in many tap waters. In some embodiments, these metal ions are replaced with sodium ions which are less likely to accumulate on plumbing and interfere with detergents. In some further embodiments, the water softener is engineered in a duplex-twin alternating fashion in order to provide water to the system 24 hours per day and regenerate the resin on a frequent basis. In such embodiments, while one of the water softening twins is in a regeneration cycle, the other twin is on-line providing soft water to the system. In some embodiments, the resin is regenerated by concentrated brine containing one or more of the following: sodium chloride, potassium chloride, and hydrochloric acid. In other embodiments, the water softening is performed by a single softening unit or a plurality of tandem units.

Carbon filters use activated carbon to remove contaminants and impurities from a fluid or solution. This process utilizes chemical adsorption, a process by which particles, atoms, ions, or molecules adhere to a surface, in this case activated carbon. In some embodiments, carbon is used to filter out chlorine, chloramines, and organic impurities from incoming water in a purified water system. One complication of utilizing an organic component such as activated carbon in a water filtration system is microbial contamination. In some embodiments, disinfected portable exchange carbon canisters and virgin acid washed carbon are utilized each time the carbon filter is exchanged in the system. In some embodiments, the carbon canisters are bacteria tested and validated with the QSR procedure TWTS 000010SO, a carbon disinfection procedure. The pore volume available in the activated carbon is often denoted with iodine numbers. In some embodiments, activated carbon with an iodine number of 900 or greater is utilized in the system.

Reverse osmosis is a filtration technique that can be used to create high-purity water. This well-established technique involves application of pressure to fluid on one side of a selectively permeable membrane. Given a properly sized membrane, this process concentrates the fluid on the side of the membrane opposite the pressure. In some embodiments, reverse osmosis is used as a component of the filtration system. In our experiments, we have determined that a reverse osmosis unit that starts and stop frequently for short periods of time results in poor rejection of inorganic and organic substances, ultimately increasing the microbial content of the purified water treatment system. In some embodiments, the reverse osmosis unit is custom engineered to activate and remain active for a maximum period of time in order to assist in rejection and control of *Legionella* bacteria in the system.

In many of the current grocery store purified water misting systems, the storage vessels have bladder-style configurations. This design allows purified water to stagnate and serve as an excellent medium for bacterial growth. In some embodiments, the storage vessel contains a cone-shaped bottom portion and a domed top. Furthermore, in some embodiments the vessel is completely sealed except for a hydrophobic 0.2-micron vent filter. In some embodiments, this vent filter prevents airborne bacteria from entering the vessel, allowing the vessel to breathe in an aseptic fashion. In some further embodiments, the storage vessel is engineered to carry the minimum amount of water required to keep up with the demand at the point of use. In some other embodiments, this optimally small inner surface area assists ongoing *Legionella* bacteria control. In some embodiments, the entire amount of purified water in the storage vessel is treated with bacteria control equipment such as ultraviolet light and a final filtration step approximately every 30 minutes in order to reduce *Legionella* bacterial load.

Another problem with many purified water systems is water stagnation. When water remains still for a long period of time it serves as an excellent environment for growth of bacteria including species of *Legionella*. In the current grocery store purified water treatment systems, water is not recirculated. In this case, if the points of use are not using water, the water remains static, adding to the microbial load in the system. Some embodiments of the present invention address this concern with a purified water recirculation pump. In some embodiments, the pump is engineered to deliver a minimum of 3 feet per second flow velocity. Furthermore, in some embodiments, the pump delivers this high pumping velocity 24 hours per day without ceasing in order to control *Legionella* bacterial loads in the purified water loop.

In order to insure that a water purification system is functioning properly, a method of determining the quality of the water, in some embodiments, is included. When microbial content in water increases, electrical conductivity also increases. Conductivity of water is therefore a proxy for level of bacterial contamination. Some embodiments of the present invention determine the quality of the water that is fed to the points of use using a conductivity meter. In some embodiments, the present invention uses conductivity monitoring continuously 24 hours per day, seven days per week to insure high water quality in the purified water loop of the purification system. In some embodiments, readings above a preselected threshold level set off an alarm or warning. The system can then be cleaned or an automatic decontamination procedure can be initiated (e.g., via computer control).

One further shortcoming of current grocery store purified water misting systems is a lack of bacterial control equipment in the purified water piping systems. The pipes that lead the purified water to the point of use and back to the storage vessel (purified water distribution piping) are critical and capable of drastically increasing the bacterial load at the point of use if they are not disinfected. In some embodiments, ultraviolet disinfection is used in the purified water distribution piping in order to further reduce the microbial load, particularly *Legionella*, at the point of use. In some embodiments, ultraviolet light (e.g., with a wavelength of 254 nm) is used in order to kill bacteria or render them unable to reproduce. In other embodiments, the ultraviolet disinfection system is specifically engineered and sized for each system to meet the distribution system flow requirements. In some embodiments, ultraviolet disinfection is only employed if the system detects the presence of undesired (e.g., any) levels of bioagent in the water system.

Current grocery store purified water misting systems utilize no bacteria control equipment in the purified water distribution piping systems. To ensure delivery of highly purified water, some embodiments of the present invention include a final filtration step. To perform this filtration, some embodiments of the systems and methods include a filter (e.g., a 0.2-micron) which serves to filter *Legionella* bacteria. In some embodiments, the final filters are absolute rated.

In some embodiments the final bacteria removal filters are installed in a manner such that they receive fluid after it has been treated with ultraviolet light.

Current grocery store purified water misting stems are generally dead leg piping systems that do not recirculate the water from the point of use back to the storage vessel. When the purified water remains undisturbed, *Legionella* bacteria are able to reproduce and a biofilm can begin to accumulate. To minimize undisturbed water, some embodiments include no dead legs longer than 20 pipe diameters. In some other embodiments, the systems and methods employ distribution piping that is opaque in order to reduce the ambient light that reaches the purified water. This light can heat the water and make it more conducive to *Legionella* bacteria reproduction. Some embodiments of the systems and methods employ flexible distribution piping. In order to provide water misting to produce in grocery stores, some embodiments of the systems and methods employ a misting nozzle attached directly or indirectly to the distribution piping. In some embodiments, this nozzle turns the water from the filtration system into a fine mist which enhances the aesthetic appeal of the produce receiving the mist.

In the exemplary embodiment shown in FIG. 1, water enters the system through piping connected to a water softening component. Said water filtration device is connected via additional piping to a carbon filtration component. The carbon filtration component is connected to a reverse osmosis via further piping. Additional piping is attached to the carbon filtration component at one end and a storage tank at the other end. This storage tank is connected to a water pump with additional piping. The water pump is connected to an outlet pipe which is further connected to final filters. A UV light device is also connected to this pipe. Additional piping is attached to the final filters. This piping is attached to both the points of use and the aforementioned storage tank.

To help insure that the purified water misting system is continually able to minimize *Legionella* bacteria and maintain its ASHRAE Standard 188P validation, some embodiments described herein include bi-annual and annual preventative maintenance including carbon, filter, and bulb replacements. In addition, some embodiments of the invention employ an annual distribution piping disinfection to meet the Total Water Treatment Systems QSR Procedure TWTS000001TM "Water System Storage Tank and/or Pipeline Sanitization."

EXPERIMENTAL

The following example is provided in order to demonstrate and further illustrate certain preferred embodiment and aspects of the present invention and is not to be construed as limiting the scope thereof.

Example 1

To test this invention, one preferred embodiment was constructed. In this test, water entered the system and was processed by a duplex-twin alternating water softener. The softened water was then passed through a carbon filter with activated carbon with an Iodine number of 900 or greater. Next, the water passed through a membrane via reverse osmosis. Next, the water was stored in a large tank with a vent filter with pores no larger than 0.2 microns that fed water into the distribution piping system. Water next left the tank, underwent repressurization to achieve a flow of 3 feet per second, ultraviolet light disinfecting, and a final filtration through a filter with 0.2-micron pores. Finally, the water was delivered to a nozzle at the point of use, and unused water is directed back to the storage tank. Water was withdrawn from this nozzle and tested for *Legionella* contents with the Phigenics PVT Plus *Legionella* testing standard. This test found that this specific embodiment was very effective at removing *Legionella* bacteria from the test water.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the relevant fields are intended to be within the scope of the following claims.

We claim:

1. A method for reducing or preventing *Legionella* bacterial contamination of a water supply system comprising:
    a) passing a fluid through a water softening component;
    b) passing the effluent from a) through a carbon filtration component;
    c) passing the effluent from b) through a reverse osmosis component, wherein a storage vessel is not employed between steps a) and c);
    d) passing the effluent from c) through a water storage vessel, wherein the water storage vessel is airtight except for a microporous vent filter on said water storage vessel; and
    e) passing the effluent from d) through a recirculating pump that delivers a minimum of 3 feet per second flow velocity and that circulates water in a continuous cycle from said storage vessel, through an ultraviolet light, through a final filter, and to a distribution piping, wherein water not distributed to a point of use via said distribution piping is returned to said storage vessel.

2. The method of claim 1, wherein the water softening component comprises two softening units which operate alternately.

3. The method of claim 1, wherein the microporous vent filter is a 0.2-micron vent filter.

4. The method of claim 1, wherein the final filtration utilizes a 0.2 micron filter.

5. The method of claim 1, wherein the conductivity of the water is measured at one or more times.

6. A method of providing purified water to grocery store misting systems comprising:
    a) passing a fluid through a water softening component;
    b) passing the effluent from a) through a carbon filtration component;
    c) passing the effluent from b) through a reverse osmosis component, wherein a storage vessel is not employed between steps a) and c);
    d) passing the effluent from c) through a water storage vessel, wherein the water storage vessel is airtight except for a microporous vent filter on said water storage vessel; and
    e) passing the effluent from d) through a recirculating pump that delivers a minimum of 3 feet per second flow velocity and that circulates water in a continuous cycle from said storage vessel, through an ultraviolet light, through a final filter, and to a distribution piping, wherein water not distributed to a point of use via said distribution piping is returned to said storage vessel.

7. The method of claim 6, wherein the water softening component comprises two softening units which operate alternately.

8. The method of claim 6, wherein the microporous vent filter is a 0.2-micron vent filter.

9. The method of claim 6, wherein the final filtration utilizes a 0.2 micron filter.

10. The method of claim 6, wherein the conductivity of the water is measured at one or more times.

* * * * *